United States Patent
Wei et al.

(10) Patent No.: US 9,608,529 B2
(45) Date of Patent: Mar. 28, 2017

(54) CONVERTER AND METHOD FOR CONTROLLING THE SAME

(71) Applicant: DELTA ELECTRONICS (SHANGHAI) CO., LTD., Shanghai (CN)

(72) Inventors: Dong Wei, Shanghai (CN); Dezhi Jiao, Shanghai (CN); Daofei Xu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 45 days.

(21) Appl. No.: 14/709,693

(22) Filed: May 12, 2015

(65) Prior Publication Data

US 2015/0372600 A1    Dec. 24, 2015

(30) Foreign Application Priority Data

Jun. 18, 2014  (CN) .......................... 2014 1 0273327

(51) Int. Cl.
*G05F 1/00* (2006.01)
*H02M 3/335* (2006.01)
*H02M 1/00* (2006.01)

(52) U.S. Cl.
CPC ............ *H02M 3/33507* (2013.01); *H02M 2001/0035* (2013.01); *H02M 2001/0058* (2013.01); *Y02B 70/1491* (2013.01); *Y02B 70/16* (2013.01)

(58) Field of Classification Search
CPC  G05F 1/462; G05F 1/565; H02M 2001/0009; H02M 2001/0032; H02M 2001/0035; H02M 3/33507; H02M 3/33523

USPC ..... 323/241, 274, 283, 284, 287; 363/21.12, 363/21.13, 21.17, 21.18
See application file for complete search history.

(56) References Cited

U.S. PATENT DOCUMENTS

| | | | |
|---|---|---|---|
| 7,030,596 B1 | 4/2006 | Salerno et al. | |
| 7,755,342 B2 | 7/2010 | Chen et al. | |
| 8,080,987 B1 * | 12/2011 | Qiu .................. | H02M 3/156 323/284 |
| 8,552,695 B2 | 10/2013 | Stracquadaini | |
| 2010/0208500 A1 * | 8/2010 | Yan .................. | H02M 3/33523 363/21.12 |
| 2010/0219802 A1 * | 9/2010 | Lin .................... | H02M 3/33507 323/284 |
| 2012/0176820 A1 * | 7/2012 | Li ..................... | H02M 3/33507 363/21.12 |

(Continued)

FOREIGN PATENT DOCUMENTS

EP    2251966    11/2010

OTHER PUBLICATIONS

Office Action dated Sep. 5, 2016 from corresponding application No. TW 104105125.

*Primary Examiner* — Adolf Berhane
*Assistant Examiner* — Gary Nash
(74) *Attorney, Agent, or Firm* — Yunling Ren

(57) ABSTRACT

A method for controlling converter such as a Flyback converter is disclosed. A load of the Flyback converter varies between zero and a peak value. The method includes: a load detecting step for detecting the load; and an operating mode control step for controlling the Flyback converter to switch between two or more of a continuous conduction mode, a valley conduction mode and a burst mode according to the load. A converter such as a Flyback converter is also provided.

22 Claims, 10 Drawing Sheets

(56) References Cited

U.S. PATENT DOCUMENTS

2012/0281438 A1\* 11/2012 Fang ................. H02M 3/33515
                                                    363/21.12
2013/0100713 A1    4/2013 Wei et al.
2013/0107584 A1\*  5/2013 Li ........................... H02M 1/08
                                                    363/21.12

\* cited by examiner

N-TH WAVE VALLEY

FIRST WAVE VALLEY

CONVERTER AND METHOD FOR CONTROLLING THE SAME

TECHNICAL FIELD

The present disclosure generally relates to a method for controlling a converter and a converter using the same.

BACKGROUND

Nowadays, energy efficient is the key specification for a power supply. To meet world-wide energy saving regulation, the power supplies are required to have high efficiency not only at rated full load operation condition, but also at light load operation condition.

SUMMARY

The present disclosure is proposed to solve, at least in part, how to design a switching mode power supply meeting both the requirement for peak load and relatively high efficiency.

An object of the present disclosure is to provide a method for controlling a Flyback converter. The load of the Flyback converter varies between zero and a peak value. The method includes: a load detecting step for detecting the load; and an operating mode control step for controlling the Flyback converter to switch between two or more of a continuous conduction mode, a valley conduction mode and a burst mode according to the detected load.

Another object of the present disclosure is to provide a Flyback converter. The load of the Flyback converter is variable between zero and a peak value. The Flyback converter includes: a transformer configured to comprise a primary winding and a secondary winding; a switch configured to be connected between the primary winding and a ground terminal; a load detecting unit configured to detect the load; and an operating mode control unit configured to control the Flyback converter to switch between two or more of a continuous conduction mode, a valley conduction mode and a burst mode according to the detected load.

Another object of the present disclosure is to provide a method for controlling a converter. The load of the converter is variable between zero and a peak value. The method includes: a load detecting step for detecting the load; and an operating mode control step for controlling an operating mode of the converter to be any one of a continuous conduction mode, a valley conduction mode and a burst mode according to the detected load.

Another object of the present disclosure is to provide a converter. The load of the converter is variable between zero and a peak value. The converter includes: a load detecting unit configured to detect the load; and an operating mode control unit configured to control an operating mode of the converter to be any one of a continuous conduction mode, a valley conduction mode and a burst mode according to the detected load.

The Flyback converter of the present disclosure may meet the requirements for peak load, meanwhile improves the efficiency. The method for controlling a Flyback converter of the present disclosure comprises, enabling the Flyback converter to operate in a continuous conduction mode under a heavy load, and when the load lowers to a certain value or the input voltage is increased to a certain value, enabling the Flyback converter to enter into a valley conduction mode and even into a burst mode. Thus, the turn-on loss of the switch may be effectively decreased thereby improving the conversion efficiency of the Flyback converter.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

The present disclosure will be described in detail with reference to FIGS. 1A to 3B in which the same numbers will represent the same or similar devices or signals, and the reference numbers of respective elements not only represent the elements themselves but also represent the algebraic symbols of capabilities of these elements.

Flyback converter is used for low power of power supply design, such as AC adapter for notebook computers, due to the features of simple structure with single switch operation, extra-wide input voltage range operation capability for universal AC input design, and still performs satisfying efficiency both at full load operation condition and light load operation condition. With emergency of Turbo Boost Technology for personal computers, power supplies should be able to provide a peak power for a short period of time during which the computer draws not less than 1.2 times of rated power, for example, up to 2.5 times of rated power while the power supply should maintain its output voltage in regulation and still satisfying the energy efficient regulations.

A method to control the Flyback converter to perform high efficiency while operated to provide peak power is needed.

Figure 1A:
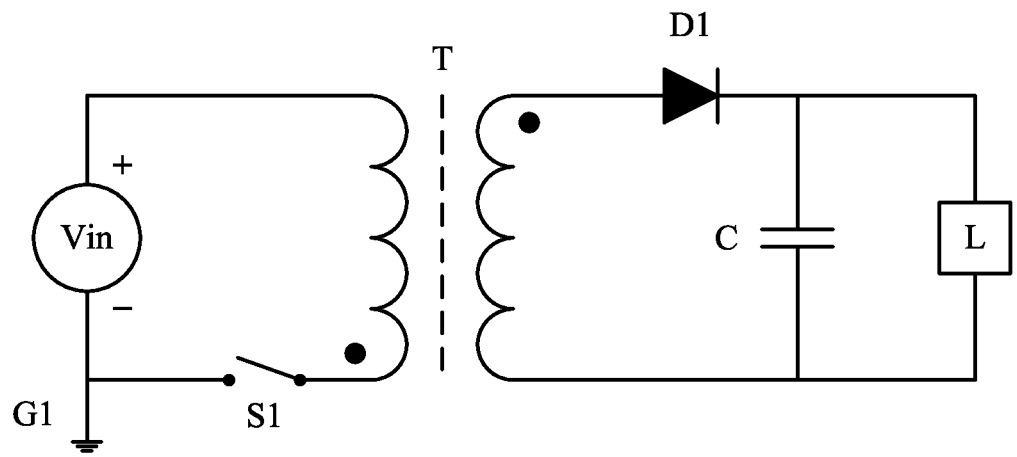
FIG. 1A illustrates a typical topology schematic diagram of a Flyback converter.

FIG. 1A is a typical topology schematic diagram of a Flyback converter. As shown in FIG. 1A, the Flyback converter includes a transformer T, a switch S1, a diode D1 and a ground terminal G1. The transformer includes a primary winding and a secondary winding. The switch S1 is connected between a second terminal of the primary winding and the ground terminal G1. The Flyback converter receives, between a first terminal of the primary winding and the ground terminal G1, a direct current input voltage Vin. According to an embodiment of the present disclosure, the ground terminal G1 is not exactly the ground, it is a voltage reference terminal. The diode D1 is connected between a first terminal of the secondary winding and a load L. The alternating current output from the transformer is rectified by the diode D1 and filtered by a capacitor C and then provided to any load L.

Figure 2A:
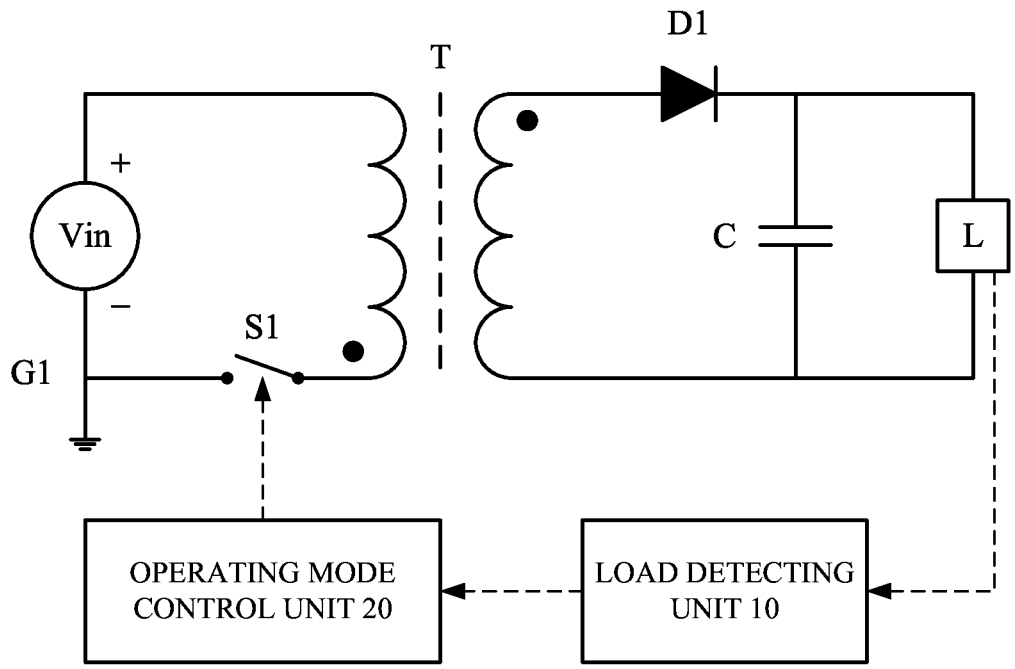
FIG. 2A illustrates a schematic block diagram of a Flyback converter according to an embodiment of the present disclosure.

FIG. 2A illustrates a schematic block diagram of a Flyback converter according to an embodiment of the present disclosure. As shown in FIG. 2A, the load L at an output of the Flyback converter according to an embodiment of the present disclosure may change arbitrarily between zero and a peak value. The Flyback converter further includes: a load detecting unit 10 configured to detect the load L; and an operating mode control unit 20 configured to control an operating mode of the Flyback converter according to the load L. When the the load L is not less than a first threshold, i.e., under a relatively heavy load, the operating mode control unit 20 controls the Flyback converter to switch to a Continuous Conduction Mode (CCM); when the load L is less than the first threshold and greater than a second threshold, i.e., under a light load operation condition, the operating mode control unit 20 controls the Flyback converter to switch to a valley conduction mode, and the first threshold is greater than the second threshold; when the load L is not greater than the second threshold, i.e., under extremely light load operation condition, the operating mode control unit 20 controls the Flyback converter to switch to a burst mode. That is to say, the operating mode control unit 20 of the present disclosure controls the operating mode of the Flyback mode to be any one of the continuous conduction mode, the valley conduction mode and the burst mode according to the load L.

As shown in FIG. 2A, the load detecting unit 10 detects the load L by detecting an output voltage or an output current applied to the load L at the output t of the Flyback converter.

Figure 2B:
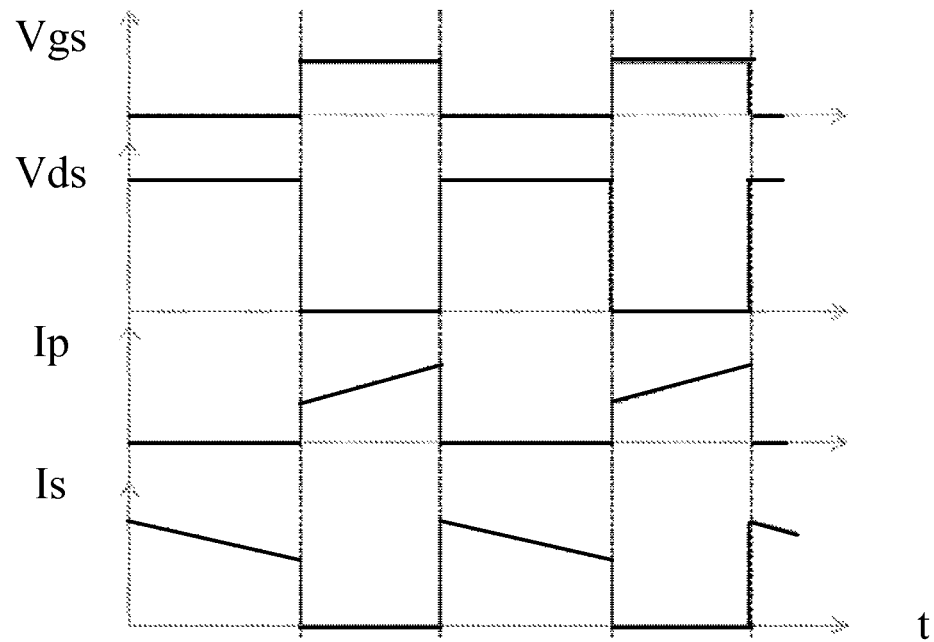
FIG. 2B illustrates waveforms of voltages and currents when the Flyback converter of the present disclosure is operating in Continuous Conduction Mode (CCM)
Figure 2C:
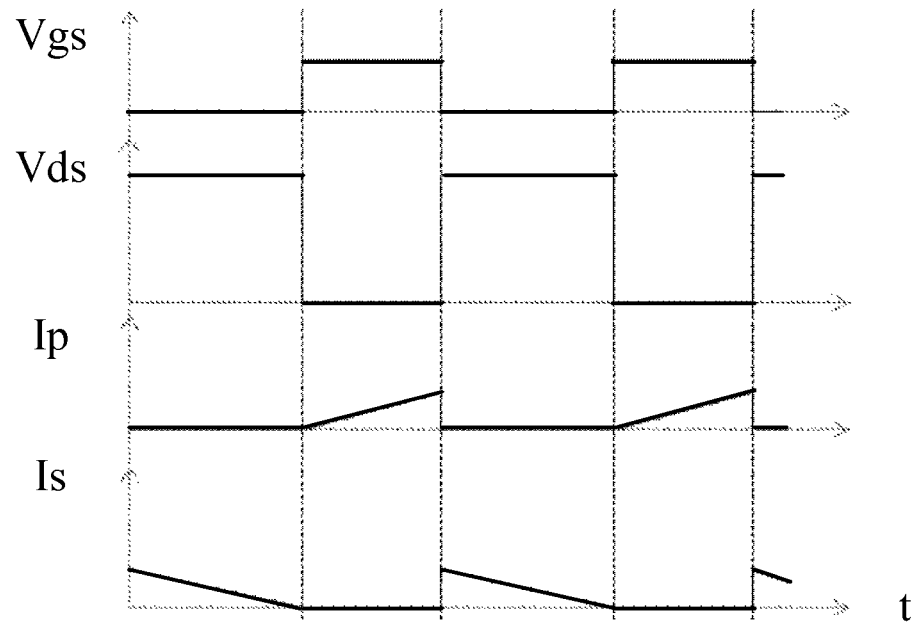
FIG. 2C illustrates waveforms of voltages and currents when the Flyback converter of the present disclosure is operating in the CCM and when the current is in critical continuous state.
Figure 2D:
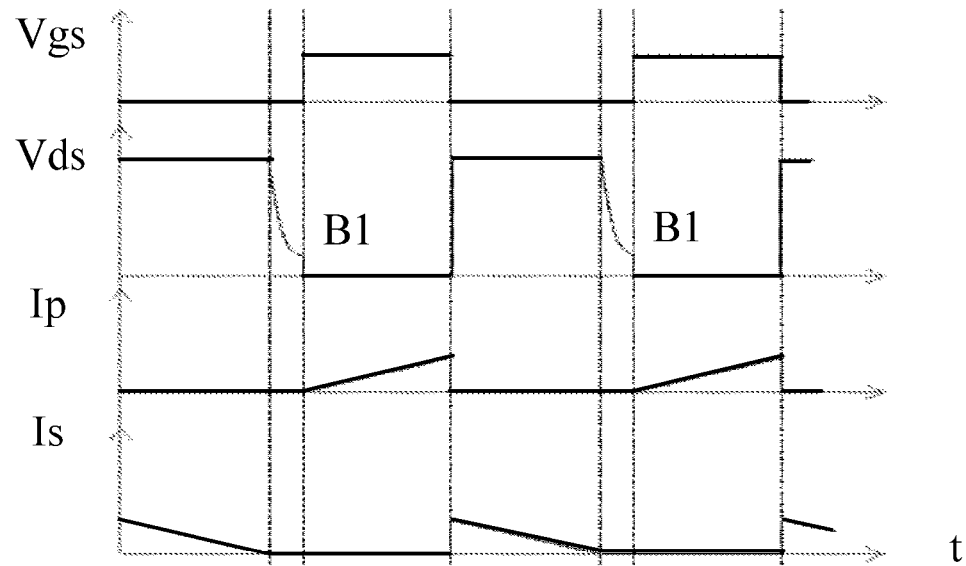
FIG. 2D illustrates waveforms of voltages and currents when the Flyback converter of the present disclosure is operating in a valley conduction mode.
Figure 2E:
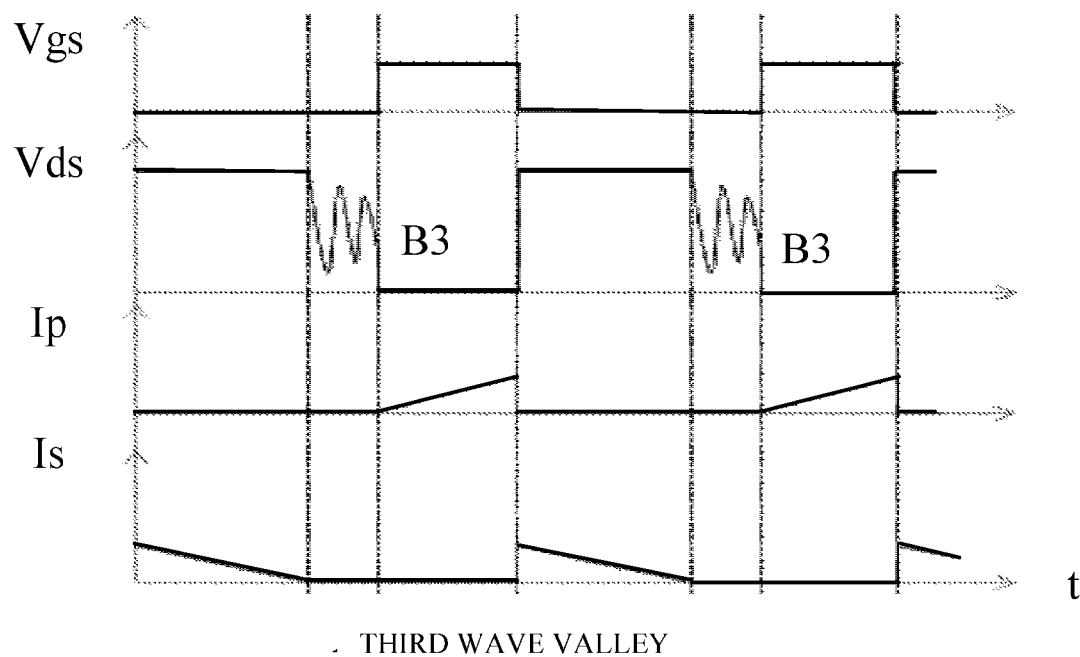
FIG. 2E illustrates waveforms of voltages and currents when the Flyback converter of the present disclosure is operating in the valley conduction mode.
Figure 2F:
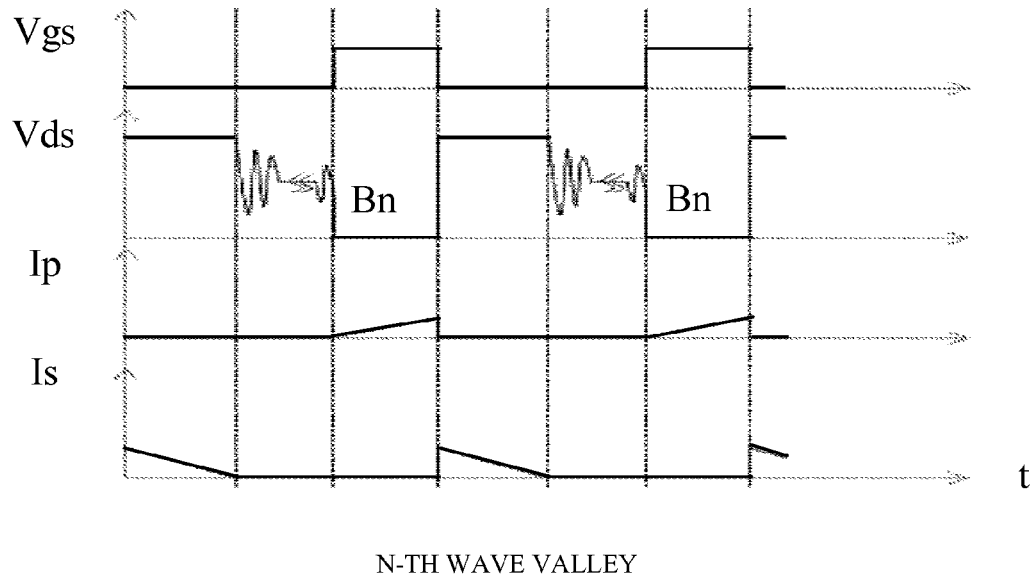
FIG. 2F illustrates waveforms of voltages and currents when the Flyback converter of the present disclosure is operating in the valley conduction mode.

FIG. 2B illustrates waveforms of voltages and currents when the Flyback converter of the present disclosure is operating in CCM. FIG. 2C illustrates waveforms of voltages and currents when the Flyback converter of the present disclosure is operating in the CCM and when the current is in critical continuous state. FIG. 2D illustrates waveforms of voltages and currents when the Flyback converter of the present disclosure is operating in a valley conduction mode. FIG. 2E illustrates waveforms of voltages and currents when the Flyback converter of the present disclosure is operating in the valley conduction mode. FIG. 2F illustrates waveforms of voltages and currents when the Flyback converter of the present disclosure is operating in the valley conduction mode.

FIG. 2B shows voltages and current waveforms when the Flyback converter is operating in the CCM. Vgs represents a waveform of a driving voltage of the switch S1, Vds represents the voltage imposed on the switch S1 when operating, Ip represents a waveform of the current flowing through the primary switch S1, and Is represents a waveform of the current flowing through the secondary switch such as the diode D1 (in the following description, the above reference numbers have the same meaning).

When operating in the CCM, if the switch S1 is turned on, i.e., when the waveform of Vgs is variable from 0 to a high level, the voltage Vds imposed on the switch S1 is variable sharply from a maximum value to 0. The switching loss during the turning on of the switch S1 is related to the maximum value of the voltage Vds imposed on the switch S1, i.e., a higher voltage Vds will result in a greater switching loss during the turning on of the switch S1.

FIG. 2C shows waveforms of voltages and currents when the primary current Ip is at a continuous and a discontinuous boundary for the load L is becoming smaller or the input voltage Vin is becoming higher (usually, the load is more inclined to change). When the load L is becoming smaller or the input voltage Vin is becoming higher, the current Ip and Is flowing through the primary and secondary switches will be decreased. Under a certain load condition or a certain input voltage condition, for example, when the load L lowers to the first threshold, each time when the switch S1 are turned on, the current Ip at the primary side rises from zero, and meanwhile the current at the secondary side falls down to zero. At this time, the boundary between the continuous conduction and the discontinuous conduction is reached. Before the boundary (or the threshold) is reached, the Flyback converter still maintains at the operating state of CCM. After the boundary is reached, if the load L continues to fall down or the input voltage continues to rise, or the both, the Flyback converter of the present disclosure enters into the valley conduction mode.

Figure 1B:
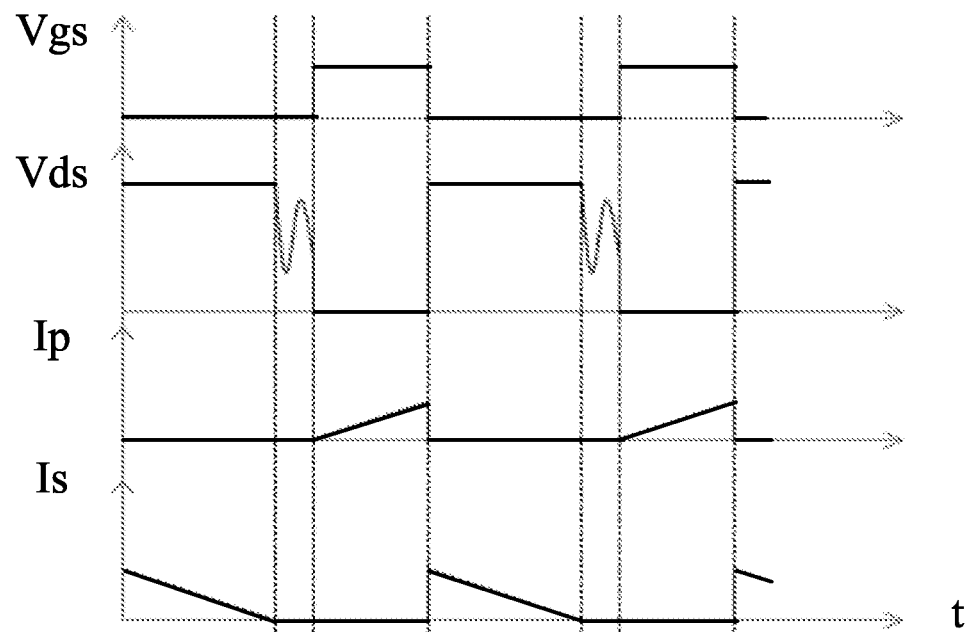
FIG. 1B illustrates waveforms of voltages and currents of a conventional Flyback converter operating in Discontinuous Conduction Mode (DCM)
Figure 1C:
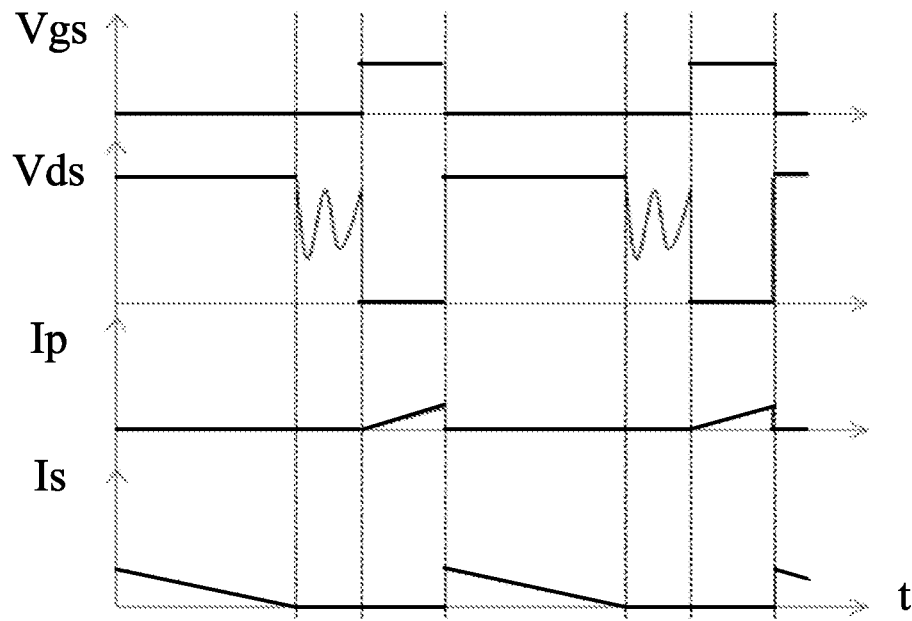
FIG. 1C illustrates waveforms of voltages and currents when a conventional Flyback converter is operating in the DCM.

When the load L is less than the first threshold and greater than the second threshold (the first threshold is greater than the second threshold), the Flyback converter switches to the valley conduction mode. The valley conduction mode of the present disclosure is shown in FIG. 2D. When the currents Ip and Is enter into the discontinuous mode, the parasitic capacitance of the switch S1 and the magnetic inductance of the transformer T will cause free resonance, and FIG. 2D shows a first wave valley of the resonance. At this time, it is needed to detect a waveform of the resonance voltage on the switch S1. When Vds reaches a valley of the resonance voltage, i.e., a minimum value of the resonance voltage, it turns on the switch S1, which is not like the conventional CCM control mode as shown in FIGS. 1B and 1C in which, because the Flyback converter operating in the CCM employs a fixed frequency control mode, when the driving signal Vgs is coming, the switch S1 is immediately turned on no matter what value of the voltage Vds imposed on the switch S1 at this time is. If Vds on the switch S1 at this time is the minimum value (i.e., at the resonance valley), the switching loss generated at this time is relatively small, as shown in FIG. 1B. However, if the voltage Vds on the switch S1 at this time is the maximum value (i.e., at the resonance peak), a quite high switching loss is generated at this time as shown in FIG. 1C. Thus, as shown in FIG. 1C, the efficiency of the Flyback converter, especially the efficiency under a light load operation condition, will be impacted greatly.

During practical use, depending on the different load L, the time for the free resonance will differ, for example, the number of the resonance cycle will is variable from 1 to 2 and even is variable into n (n is a natural number), i.e., the load L determines the length of the resonance time. FIGS. 2E and 2F show that, when the load L continues to fall down, the turning-on time of the switch S1 becomes shortened, the free resonance time becomes longer and for example the resonance cycle may grow from 1 to 2. FIG. 2E shows that the switch S1 is turned on at a third valley B3 of the resonance voltage, and FIG. 2F shows that the switch S1 is turned on at an n-th valley Bn of the resonance voltage. Under such condition, it is needed to detect the resonance voltage, i.e., the voltage Vds imposed on the switch S1. When the voltage Vds reaches a valley, the turning on action of the switch is performed, thereby the switching loss being decreased.

As described above, when the load L is not greater than the second threshold, i.e., under an extremely light load operation condition, the Flyback converter is controlled to switch to the burst mode. In the burst mode of the present disclosure, the Flyback converter bursts on for a certain time period so that the switch S1 receives a high frequency driving signal, and the Flyback converter bursts off for a certain time period so that the driving signal will be completely turned off. Thus, the switching loss under an extremely light load operation condition may be decreased, and the efficiency of the Flyback converter may be further increased. The present disclosure does not make further limitation on the burst mode.

Figure 2G:
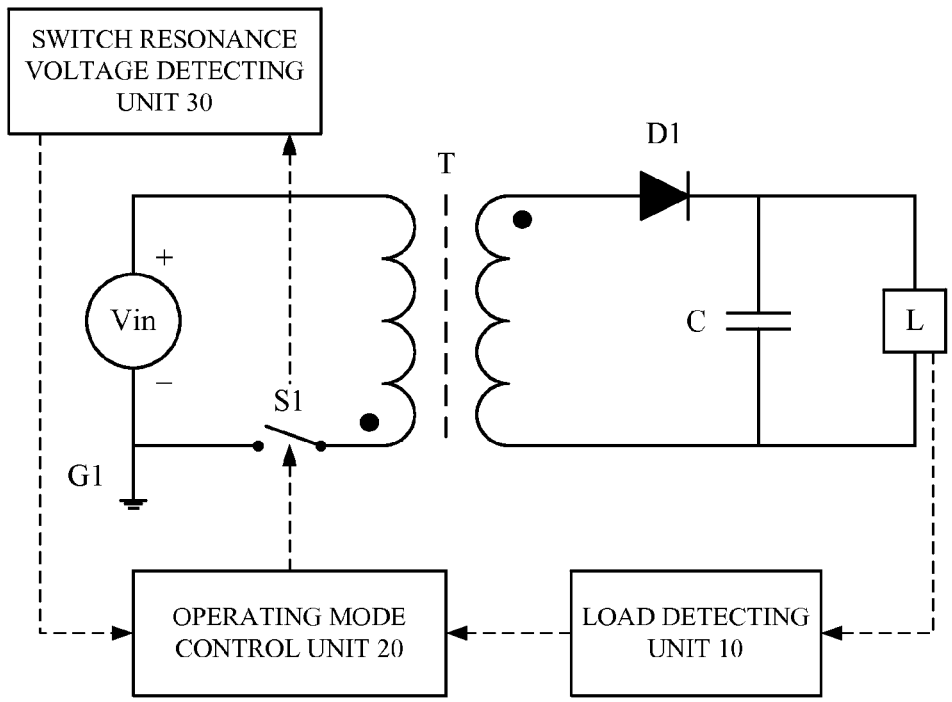
FIG. 2G illustrates a schematic block diagram of a Flyback converter according to another embodiment of the present disclosure.

FIG. 2G illustrates a schematic block diagram of a Flyback converter according to another embodiment of the present disclosure. As shown in FIG. 2G, the Flyback converter of the present disclosure further includes: a switch resonance voltage detecting unit 30 configured to detect a waveform of the resonance voltage imposed on the switch S1 by the primary side of the Flyback converter when the load L is less than the first threshold and greater than the second threshold, i.e., under a light load operation condition. The operating mode control unit 20 determines the time point when the waveform of the resonance voltage Vds on the switch S1 is at valley as the turn-on timing of the switch S1.

Figure 2H:
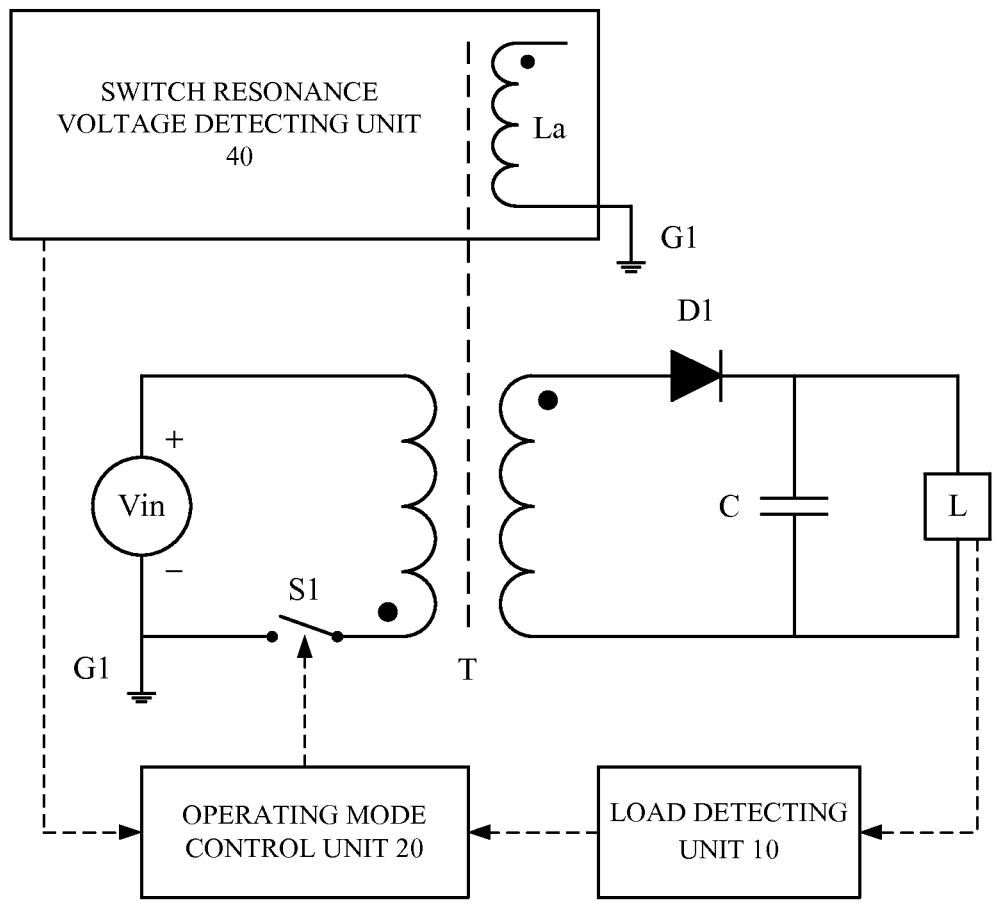
FIG. 2H illustrates a schematic block diagram of a Flyback converter according to another embodiment of the present disclosure.
Figure 2I:
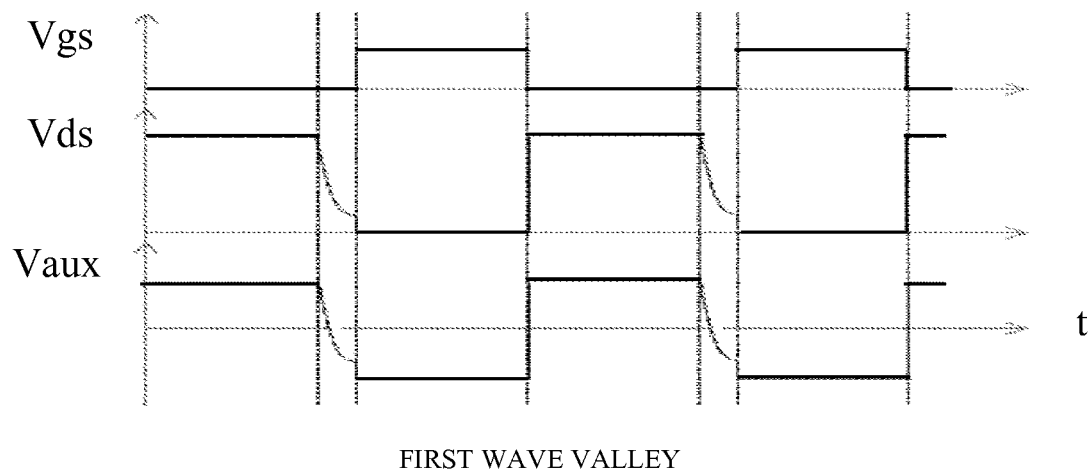
FIG. 2I illustrates waveforms of voltages and currents when the Flyback converter in FIG. 2H is operating in the valley conduction mode.

FIG. 2H illustrates a schematic block diagram of a Flyback converter according to another embodiment of the present disclosure. FIG. 2I illustrates waveforms of voltages and currents when the Flyback converter in FIG. 2H is operating in the valley conduction mode. As shown in FIGS. 2H and 2I, the Flyback converter of the present disclosure further includes: a switch resonance voltage detecting unit 40 which includes an auxiliary winding La coupled with the primary winding of the Flyback converter, wherein the switch resonance voltage detecting unit 40 is configured to detect a voltage Vaux on the auxiliary winding La when the load L is less than the first threshold and greater than the second threshold, i.e., under a light load operation condition.

The voltage Vaux on the auxiliary winding La reflects the resonance voltage Vds imposed on the switch S1 by the primary side of the flyback converter. The operating mode control unit 20 determines the time point when the waveform of the voltage Vaux on the auxiliary winding La is at valley (i.e., when the waveform of the resonance voltage Vds on the switch S1 is at valley) as the turn-on timing of the switch S1.

Figure 2J:
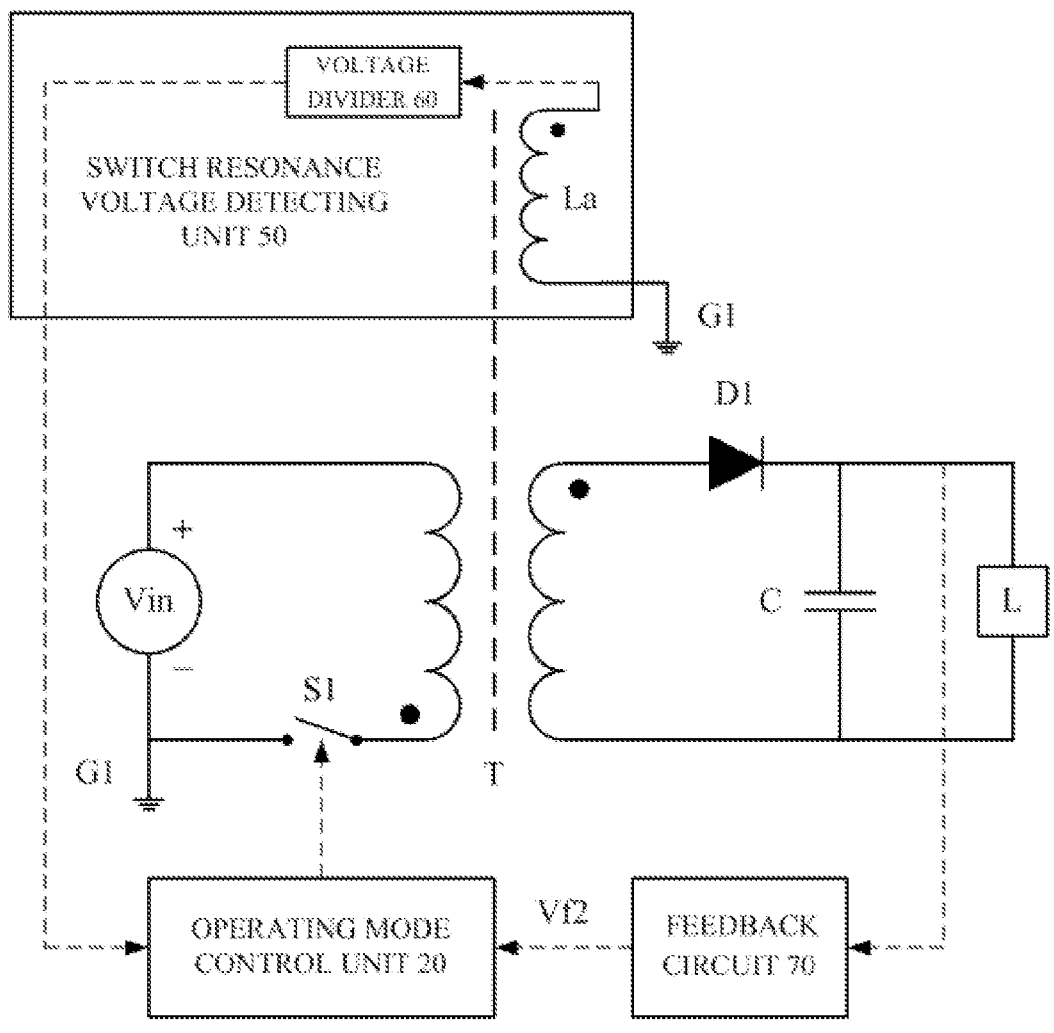
FIG. 2J illustrates a schematic block diagram of a Flyback converter according to another embodiment of the present disclosure.
Figure 2K:
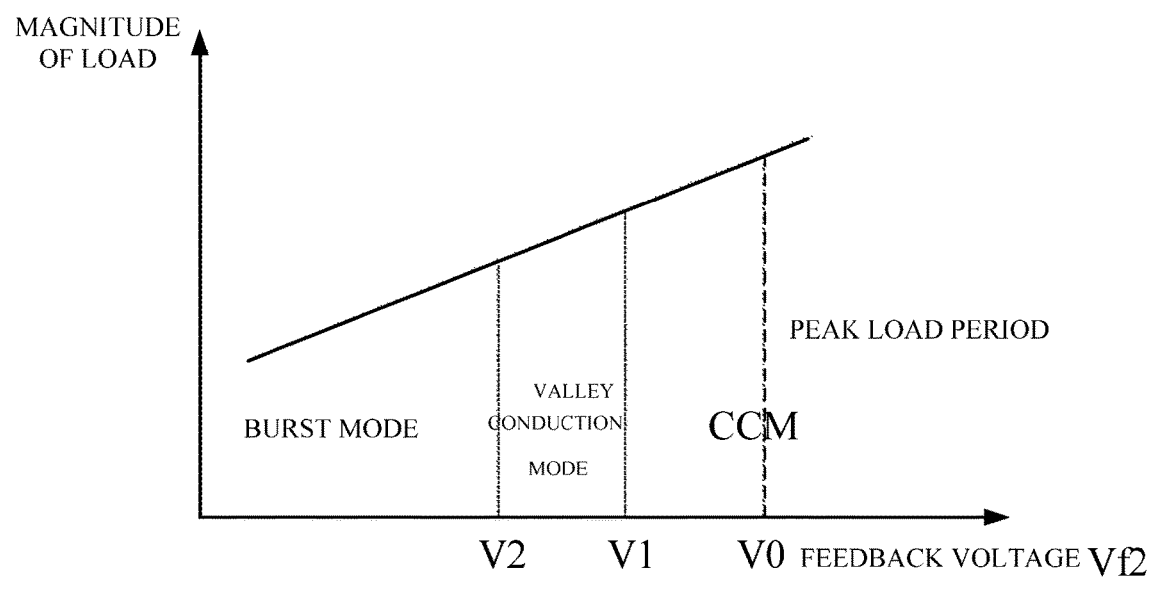
FIG. 2K illustrates a schematic diagram of a relationship between a feedback voltage and a load in the Flyback converter in FIG. 2J.

FIG. 2J illustrates a schematic block diagram of a Flyback converter according to another embodiment of the present disclosure. FIG. 2J is an embodied technical solution based on FIG. 2H. In the Flyback converter of the present disclosure, the load detecting unit 10 in FIG. 2H may be embodied as a feedback circuit 70 in FIG. 2J which, by detecting the output voltage or the output current imposed on the load L at the output terminal of the Flyback converter so as to generate a feedback voltage Vf2, detects the load L. That is to say, in the Flyback converter and the method for controlling the Flyback converter, the state of the load L in the circuit may be reflected by the voltage level of the feedback voltage Vf2. FIG. 2K illustrates a schematic diagram of a relationship between a feedback voltage and a load in the Flyback converter in FIG. 2J.

As shown in FIG. 2J, when the switch S1 in the circuit is operating in the CCM state, or when the switch S1 in the circuit is operating in the valley conduction mode, or when the switch S1 in the circuit is operating in the burst mode, or when the switch S1 in the circuit is operating in the peak load period in the CCM state may be determined by detecting the voltage level of the feedback voltage Vf2. Generally, the feedback circuit 70 may generates a feedback voltage Vf2 according to the load L, and this may make the voltage Vf2 rise as the load L becomes heavier, and as the load become lighter, Vf2 falls down linearly, as shown in FIG. 2K. Several values may be set for Vf2 as the thresholds for entering into different operation modes.

When the feedback voltage Vf2 is a value not less than V1 (corresponding to the above-mentioned first threshold), the load L is appropriate or relatively heavy, and the circuit is operating in the CCM state, and at this time the Flyback converter outputs a certain power. Under the CCM state, when the load L is very heavy, for example, when the feedback voltage Vf2 is a value not less than V0 (corresponding to a third threshold), it can be deemed that the load of the Flyback converter reaches its peak value (V0 is greater than V1), the Flyback converter starts to operate in the peak load period in the CCM state, and at this time the Flyback converter raises the switching frequency of the switch S1 so as to provide an output power larger than that in the normal CCM state.

When the load L lowers, the feedback voltage Vf2 falls down linearly. When the voltage value is decreased to V1 (corresponding to the above-mentioned first threshold), the load L is relatively light. When the load L continues to lower and the feedback voltage Vf2 is less than V1, the circuit enters into the DCM state, i.e., the circuit switches into the valley conduction mode.

When the load L further lowers and the feedback voltage Vf2 is lower than V2 (corresponding to the above-mentioned second threshold), the circuit switches to the state of burst mode.

In an embodiment of the present disclosure, the Flyback converter operates in valley conduction mode under rated power, and when the load L continues to increase, for example to the load not less than 1.2 times of the rated power, the Flyback converter operates in the peak load period in the CCM state. In one embodiment, at this time the Flyback converter raises the switching frequency of the switch S1 so as to provide an output power larger than that in the normal DCM state.

The value of the feedback voltage Vf2 may be sent to the operating mode control unit 20. Thus, the time of entering into an operating mode and entering into which mode may be determined by detecting the value of the feedback voltage Vf2.

As another embodiment, in the Flyback converter of the present disclosure, the switch resonance voltage detecting unit 40 in FIG. 2H may be embodied as a switch resonance voltage detecting unit 50 in FIG. 2J which obtains the voltage Vaux on the auxiliary winding La with a voltage divider 60.

The Flyback converter of the present disclosure as shown in FIGS. 2A, 2G, 2H and 2J makes it possible to detect the resonance voltage valley of the switch S1 (i.e., detecting the voltage Vds on the switch S1). For example, the detecting circuit in FIG. 2J, i.e., the switch resonance voltage detecting unit 50, is constituted by the auxiliary winding La of the transformer T and a voltage divider 60. The auxiliary winding La of the transformer for detecting is coupled with the primary winding of the transformer T (for example, the auxiliary winding La and the primary winding are wounded in a concentric manner), thus the voltage on the auxiliary winding La can reflect the instantaneous voltage Vds imposed on the switch S1. The minimum value of the voltage Vaux on the winding La reflects the minimum value of the voltage Vds imposed on the switch S1. Sending the detected signal to the control circuit (the control circuit is generally an integrated control circuit), i.e., the operating mode control unit 20 to control the converter, then the requirement for detecting the valley of the resonance voltage (i.e., the voltage Vds on the switch S1) may be met.

Figure 2L:
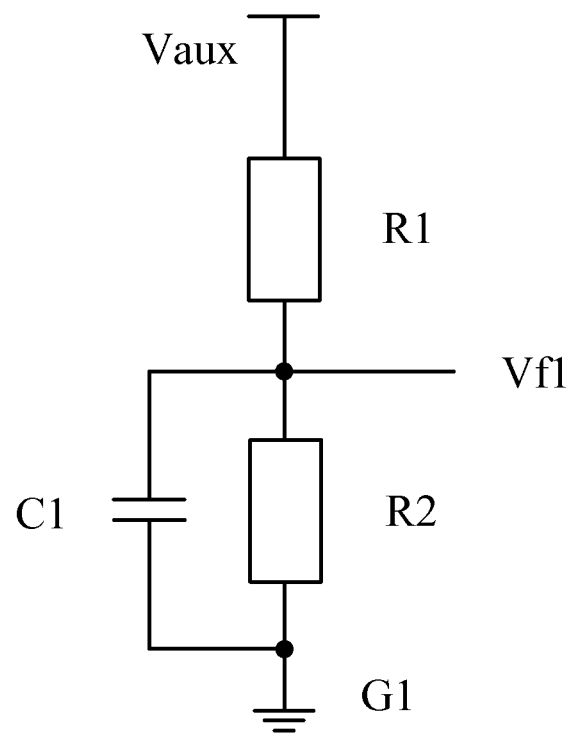
FIG. 2L illustrates a schematic block diagram of a voltage divider of the Flyback converter in FIG. 2J according to an embodiment of the present disclosure.

FIG. 2L illustrates a schematic block diagram of a voltage divider of the Flyback converter in FIG. 2J according to an embodiment of the present disclosure. As an embodiment, the voltage Vaux across the auxiliary winding La is divided by division resistors R1 and R2 and filtered by C1, and the output voltage Vf1 which has a waveform reflecting the waveform of the voltage Vds on the switch S1 is obtained.

Figure 2M:
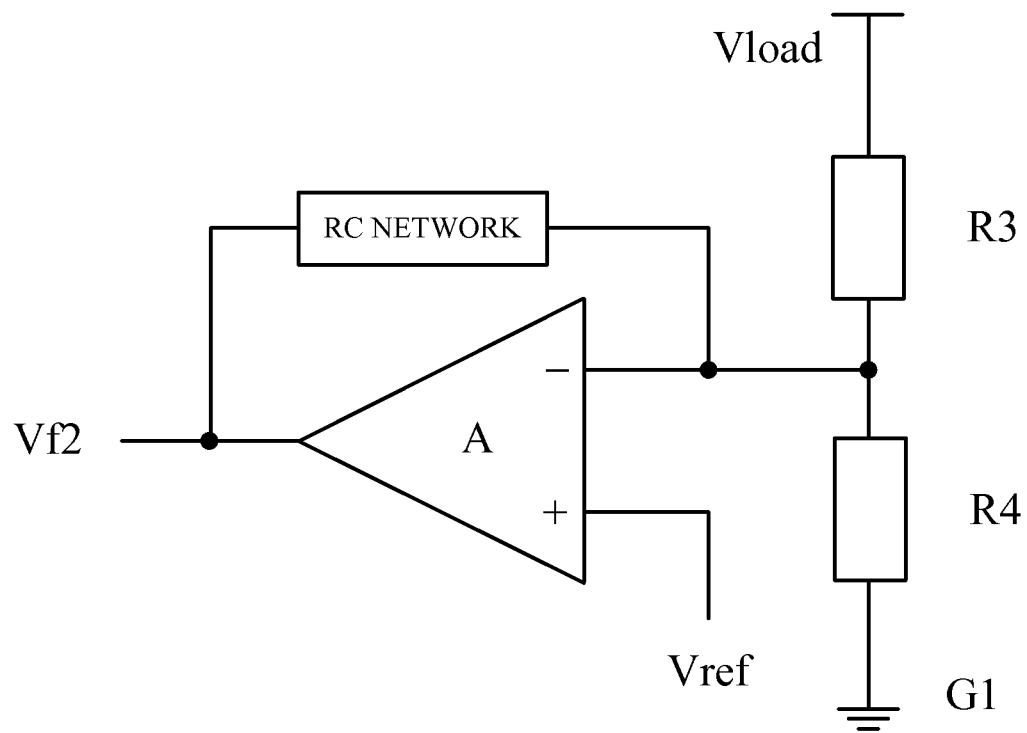
FIG. 2M illustrates a schematic block diagram of a feedback circuit of the Flyback converter in FIG. 2J according to an embodiment of the present disclosure.

FIG. 2M illustrates a schematic block diagram of a feedback circuit of the Flyback converter in FIG. 2J according to an embodiment of the present disclosure. As an embodiment, the voltage across the load L, i.e., the output voltage Vload of the Flyback converter, is sampled by the division resistors R3 and R4 and is input into a "−" input terminal of an operational amplifier A, and the load L is reflected by the outputing voltage Vf2 of the operational amplifier A. The resistor-capacitor (RC) network and the reference voltage Vref at the "+" input terminal of the operational amplifier A are the general settings for the operational amplifier A's normal operation, and detailed description thereof are omitted.

In the Flyback converter of the present application, for the operating mode of the valley conduction mode, the operating frequency of the switch in the circuit needs no definition. The operating frequency may maintain unchanged, or may be lower than that in CCM, or may be higher than that in CCM. As another embodiment of the present disclosure, in the Flyback converter, when the operating mode control unit 20 is operated in the continuous conduction mode, if the load L reaches the peak value, the switching frequency of the switch S1 at the primary side of the Flyback converter is increased so as to meet the requirements for the peak load.

The Flyback converter and the method for controlling the Flyback converter provided in the present disclosure synthesizes the advantages of the continuous conduction mode, the valley conduction mode and the burst mode, may realize a high efficiency and meanwhile facilitate solving the problem of the electromagnetic interference under a heavy load.

Figure 3A:
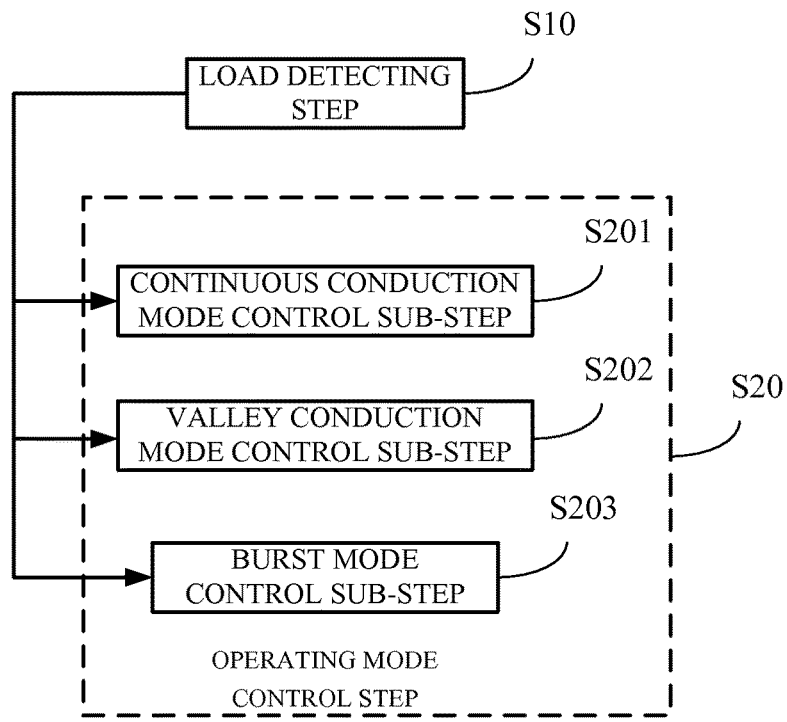
FIG. 3A illustrates a schematic flowchart of a method for controlling a Flyback converter according to an embodiment of the present disclosure.

Corresponding to the Flyback converter of the present disclosure, as another aspect of the present disclosure, the present disclosure further provides a method for controlling the Flyback converter. FIG. 3A illustrates a schematic flowchart of a method for controlling a Flyback converter according to an embodiment of the present disclosure.

As shown in FIG. 3A, the load L at the output of the Flyback converter controlled by the control method of the present disclosure may be change between zero and a peak value. The method includes the following steps.

At a load detecting step S10, the load L is detected.

At an operating mode control step S20, an operating mode of the Flyback converter is controlled according to the load L. The operating mode control step S20 is constituted by the following sub-steps:

At a continuous conduction mode control sub-step S201, when the load L is not less than the first threshold, the Flyback converter is controlled to switch to a continuous conduction mode.

At a valley conduction control sub-step S202, when the load L is less than the first threshold and greater than the second threshold, the Flyback converter is controlled to switch to a valley conduction mode, wherein the first threshold is greater than the second threshold.

At a burst mode control sub-step S203, when the load L is not greater than the second threshold, the Flyback converter is controlled to switch to a burst mode.

That is to say, operating mode control step of the method for controlling the Flyback converter in the present disclosure comprises controlling the operating mode of the Flyback converter to be any one of the continuous conduction mode, the valley conduction mode or the burst mode according to the detected the load L.

As another embodiment of the present disclosure, in the method for controlling the Flyback converter of the present disclosure, the load detecting step S10 comprises detecting the load L by detecting an output voltage or an output current at the output of the Flyback converter.

As another embodiment of the present disclosure, in the method for controlling the Flyback converter of the present disclosure, the load detecting step S10 comprises detecting the load L by detecting the output voltage or the output current at the output of the Flyback converter so as to generate a feedback voltage Vf2.

Figure 3B:
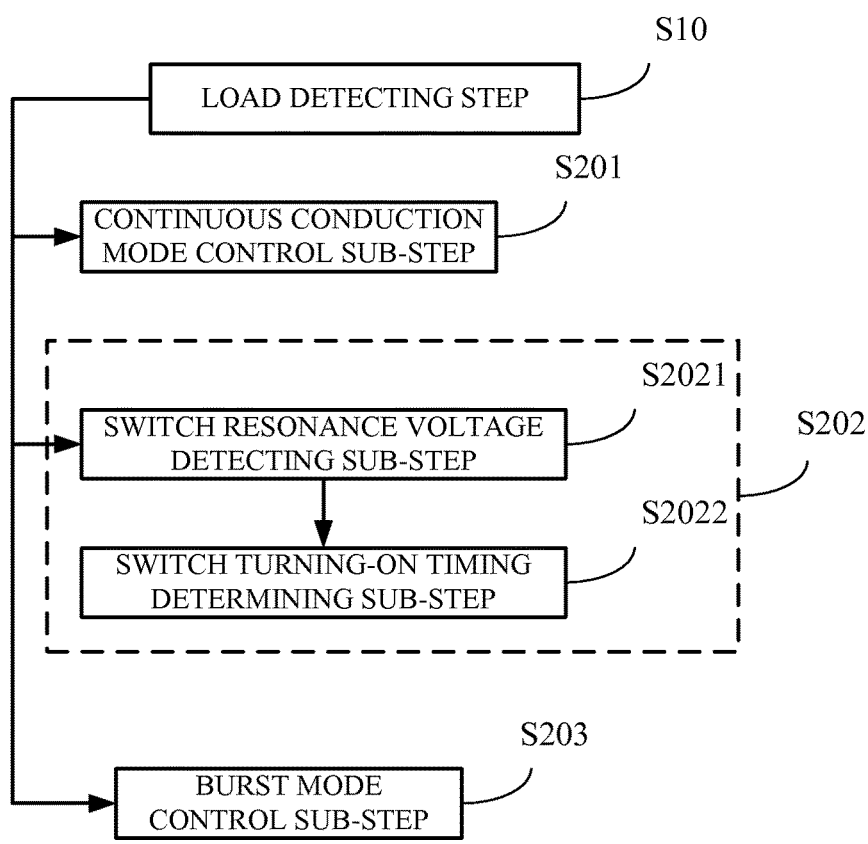
FIG. 3B illustrates a schematic flowchart of a method for controlling a Flyback converter according to another embodiment of the present disclosure.

FIG. 3B illustrates a schematic flowchart of a method for controlling a Flyback converter according to another embodiment of the present disclosure. As shown in FIG. 3B, as another embodiment of the present disclosure, in the method for controlling the Flyback converter of the present disclosure, the valley conduction mode control sub-step S202 is constituted by the following sub-steps:

At a switch resonance voltage detecting sub-step S2021, when the load L is less than the first threshold and greater than the second threshold, a waveform of the resonance voltage Vds imposed on the switch S1 is detected.

At a switch turn-on timing determining sub-step S2022, the time point when the waveform of the resonance voltage Vds imposed on the switch S1 is at valley is determined as the turn-on timing of the switch S1.

As another embodiment of the present disclosure, in the method for controlling the Flyback converter of the present disclosure, the valley conduction mode control sub-step S202 may be further constituted by the following steps:

At a switch resonance voltage detecting sub-step S2021, when the load L is less than the first threshold and greater than the second threshold, the voltage Vaux across the auxiliary winding La coupled with the primary winding of the Flyback converter is detected, and the voltage Vaux across the auxiliary winding La reflects the resonance voltage Vds imposed on the switching S1 by the primary side of the Flyback converter.

At a switch turn-on timing determining sub-step S2022, the time point when the waveform of the voltage Vaux across the auxiliary winding La at valley is determined as the turn-on timing of the switch S1.

As another embodiment of the present disclosure, in the method for controlling the Flyback converter of the present disclosure, the continuous conduction mode control sub-step S201 comprises, when the load L reaches the peak value, increasing the switching frequency of the switch S1 at the primary side of the flyback converter.

The specific implementations of the above steps in the method for controlling the Flyback converter in the present disclosure may employ the same implementations as that in the above technical solutions with respect to the Flyback converter, and detailed descriptions are omitted.

The Flyback converter of the present disclosure may easily meet the requirements for peak load, and meanwhile improves the efficiency. The method for controlling a Flyback converter of the present disclosure comprises, enabling the Flyback converter to operate in a continuous conduction mode under a heavy load, and when the load lowers to a certain value or the input voltage is increased to a certain value, enabling the Flyback converter to enter into a valley conduction mode and even into a burst mode. Thus, the turn-on loss of the switch may be effectively decreased thereby improving the conversion efficiency of the Flyback converter.

The control mode of present disclosure is described taking the example of the Flyback converter. In practical use, the control mode is not limited to be used in the Flyback converter, and may be applied into other converters such as isolation bridge circuit, non-isolation buck circuit. The specific implementations are the same as the above, and detailed description are omitted.

The load detecting unit of the present disclosure is not limited to the above mentioned embodiment, any technology which may detect the load states may be used, and detailed descriptions are omitted.

The switch resonance voltage detecting unit of the present disclosure is not limited to the above mentioned embodiment, and any technology which may detect a switch voltage may be used, and detailed descriptions are omitted.

Although the present invention has been described with reference to typical embodiments, it should be understood that the terminologies herein are for illustrative purposes rather than to limit the present invention. The present invention can be implemented in many specific embodiments without departing from the spirit and scope of the present invention, thus it shall be appreciated that the above embodiments shall not be limited to any details described above, but shall be interpreted broadly within the spirit and scope defined by the appended claims. The appended claims intend to cover all the modifications and changes falling within the scope of the appended claims and equivalents thereof.

What is claimed is:

1. A method for controlling a Flyback converter, comprising:
a load detecting step for detecting a load at an output of the Flyback converter, wherein the load varies between zero and a peak value, the Flyback converter comprises a switch; and
an operating mode control step for controlling the Flyback converter to switch between two or more of a continuous conduction mode, a valley conduction mode and a burst mode according to the detected load,
wherein
the operating mode control step further comprises:
a continuous conduction mode control sub-step for controlling the Flyback converter to switch to the continuous conduction mode when the load is greater than or equal to a first threshold;
a valley conduction mode control sub-step for controlling the Flyback converter to switch to the valley conduction mode when the load is less than the first threshold and greater than a second threshold, the first threshold being greater than the second threshold; and
a burst mode control sub-step for controlling the Flyback converter to switch to the burst mode when the load is less than the second threshold, and the valley conduction mode control sub-step comprises:
a switch resonance voltage detecting sub-step for detecting a voltage waveform of an auxiliary winding coupled with a primary winding of the Flyback converter when the load is less than the first threshold and greater than the second threshold, wherein the voltage on the auxiliary winding reflects a resonance voltage imposed on the switch of the Flyback converter; and
a switch turn-on timing determining sub-step for determining a time point when the voltage on the auxiliary winding is at a valley as the turn-on timing of the switch.

2. The method of claim 1, wherein, the load detecting step comprises detecting the load by detecting an output voltage or an output current at the output of the Flyback converter.

3. The method of claim 2, wherein, the load detecting step comprises detecting the load by detecting an output voltage or an output current at the output of the Flyback converter so as to generate a feedback voltage.

4. The method of claim 1, wherein
the switch resonance voltage detecting sub-step detects the resonance voltage imposed on the switch of the Flyback converter, and
the determined time point when the voltage on the auxiliary winding is at a valley is indicative of a time point when the resonance voltage imposed on the switch is at a valley.

5. The method of claim 1, wherein, the continuous conduction mode control sub-step comprises increasing a switching frequency of the switch when the load reaches the peak value.

6. A Flyback converter, comprising:
a transformer configured to comprise a primary winding and a secondary winding;
a switch configured to be connected between the primary winding and a ground terminal;
a load detecting unit configured to detect a load at an output of the Flyback converter, wherein the load varies between zero and a peak value; and
an operating mode control unit configured to control the Flyback converter to switch between two or more of a continuous conduction mode, a valley conduction mode and a burst mode according to the load,
wherein
the operating mode control unit is configured to control the Flyback converter to switch to the continuous conduction mode if the load is greater than or equal to a first threshold,
the operating mode control unit is configured to control the Flyback converter to switch to the valley conduction mode if the load is less than the first threshold and greater than a second threshold,
the operating mode control unit is configured to control the Flyback converter to switch to the burst mode if the load is less than the second threshold,
the first threshold is greater than the second threshold,
the Flyback converter further comprises a switch resonance voltage detecting unit comprising an auxiliary winding coupled with the primary winding of the Flyback converter,
the switch resonance voltage detecting unit is configured to detect a voltage waveform of the auxiliary winding when the load is less than the first threshold and greater than the second threshold,
the voltage on the auxiliary winding reflects a resonance voltage imposed on the switch of the Flyback converter, and
the operating mode control unit is configured to determine a time point when the voltage on the auxiliary winding is at a valley as the turn-on timing of the switch.

7. The Flyback converter according to claim 6, wherein the load detecting unit is configured to detect the load by detecting an output voltage or an output current at the output of the Flyback converter.

8. The Flyback converter according to claim 7, wherein the load detecting unit is configured to, by detecting an output voltage or an output current at the output of the Flyback converter so as to generate a feedback voltage, detect the load.

9. The Flyback converter according to claim 6, wherein
the switch resonance voltage detecting unit is configured to detect the resonance voltage imposed on the switch of the Flyback converter based on the voltage waveform of the auxiliary winding, and
the operating mode control unit is configured to determine a time point when the resonance voltage imposed on the switch is at a valley.

10. The Flyback converter according to claim 6, wherein the operating mode control unit is configured to increase a switching frequency of the switch if the Flyback converter is operating in the continuous conduction mode and the load reaches the peak value.

11. A method for controlling a converter, comprising:
a load detecting step for detecting a load at an output of the converter, wherein the load varies between zero and a peak value, the converter comprises a switch; and
an operating mode control step for controlling an operating mode of the converter to be any one of a continuous conduction mode, a valley conduction mode and a burst mode according to the load,
wherein
the operating mode control step comprises:
a continuous conduction mode control sub-step for controlling the converter to operate in the continuous conduction mode when the load is greater than or equal to a first threshold;
a valley conduction mode control sub-step for controlling the converter to operate in the valley conduction mode when the load is less than the first threshold and greater than a second threshold, the first threshold being greater than the second threshold; and
a burst mode control sub-step for controlling the converter to operate in the burst mode when the load is less than the second threshold,
the converter comprises a transformer, and the switch is connected between a primary winding of the transformer and a ground terminal,
the valley conduction mode control sub-step comprises:
a switch resonance voltage detecting sub-step for detecting a voltage waveform on an auxiliary winding coupled with the primary winding of the converter when the load is less than the first threshold and greater than the second threshold, wherein the voltage on the auxiliary winding reflects a resonance voltage imposed on the switch of the converter; and
a switch turn-on timing determining sub-step for determining a time point when the voltage on the auxiliary winding is at a valley as the turn-on timing of the switch.

12. The method of claim 11, wherein, the load detecting step comprises detecting the load by detecting an output voltage or an output current at the output of the converter.

13. The method of claim 12, wherein, the load detecting step comprises detecting the load by detecting an output voltage or an output current at the output of the converter so as to generate a feedback voltage.

14. The method of claim 11, wherein
the switch resonance voltage detecting sub-step detects the resonance voltage imposed on the switch of the converter, and
the determined time point when the voltage on the auxiliary winding is at a valley is indicative of a time point when the resonance voltage on the switch is at a valley.

15. The method of claim 11, wherein, the continuous conduction mode control sub-step comprises increasing a switching frequency of the switch of the converter when the load reaches the peak value.

16. The method of claim 11, wherein, the continuous conduction mode control sub-step comprises increasing a switching frequency of the switch of the converter when the load reaches the peak value.

17. A converter, comprising:
a load detecting unit configured to detect a load at an output of the converter, wherein the load varies between zero and a peak value, the converter comprises a switch; and
an operating mode control unit configured to control an operating mode of the converter to be any one of a continuous conduction mode, a valley conduction mode and a burst mode according to the load,
wherein
the operating mode control unit is configured to control the converter to switch to the continuous conduction mode if the load is greater than or equal to a first threshold,
the operating mode control unit is configured to control the converter to switch to the valley conduction mode if the load is less than the first threshold and greater than a second threshold,
the operating mode control unit is configured to control the converter to switch to the burst mode if the load is less than the second threshold, the first threshold is greater than the second threshold, the converter comprises a transformer, and the switch is connected between a primary winding of the transformer and a ground terminal, the converter further comprises a switch resonance voltage detecting unit comprising an auxiliary winding coupled with the primary winding of the converter, the switch resonance voltage detecting unit is configured to detect a voltage waveform of the auxiliary winding when the load is less than the first threshold and greater than the second threshold, the voltage on the auxiliary winding reflects the resonance voltage imposed on the switch of the converter, and the operating mode control unit is configured to determine a time point when the voltage on the auxiliary winding is at a valley as the turn-on timing of the switch.

18. The converter according to claim 17, wherein the load detecting unit is configured to detect the load by detecting an output voltage or an output current at the output of the converter.

19. The converter according to claim 18, wherein the load detecting unit is configured to, by detecting an output voltage or an output current at the output of the converter so as to generate a feedback voltage, detect the load.

20. The converter according to claim 17, wherein the switch resonance voltage detecting unit is configured to detect the resonance voltage imposed on the switch of the converter based on the voltage waveform of the auxiliary winding, and the operating mode control unit is configured to determine a time point when the resonance voltage imposed on the switch is at a valley.

21. The converter according to claim 17, wherein the operating mode control unit is configured to, when the converter is operating in the continuous conduction mode, increase a switching frequency of the switch of the converter when the load reaches the peak value.

22. The converter according to claim 17, wherein the operating mode control unit is configured to, when the converter is operating in the continuous conduction mode, increase a switching frequency of the switch of the converter when the load reaches the peak value.

* * * * *